(12) United States Patent
Yoshima et al.

(10) Patent No.: US 9,373,841 B2
(45) Date of Patent: Jun. 21, 2016

(54) BATTERY ACTIVE MATERIAL, NONAQUEOUS ELECTROLYTE BATTERY, AND BATTERY PACK

(71) Applicant: KABUSHIKI KAISHA TOSHIBA, Minato-ku (JP)

(72) Inventors: Kazuomi Yoshima, Kawasaki (JP); Yasuhiro Harada, Yokohama (JP); Hiroki Inagaki, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 108 days.

(21) Appl. No.: 14/203,800

(22) Filed: Mar. 11, 2014

(65) Prior Publication Data
US 2014/0295247 A1   Oct. 2, 2014

(30) Foreign Application Priority Data

Mar. 27, 2013 (JP) ................... 2013-065423
Mar. 11, 2014 (JP) ................... 2014-047901

(51) Int. Cl.
*H01M 4/485* (2010.01)
*H01M 10/052* (2010.01)

(52) U.S. Cl.
CPC ............ *H01M 4/485* (2013.01); *H01M 10/052* (2013.01); *Y02E 60/122* (2013.01)

(58) Field of Classification Search
CPC ........................... H01M 4/485; H01M 10/052
See application file for complete search history.

(56) References Cited

U.S. PATENT DOCUMENTS

| 2012/0107692 A1* | 5/2012 | Harada | ............... C01G 23/002 429/231.2 |
| 2014/0120404 A1* | 5/2014 | Ise | ............... H01M 4/485 429/156 |
| 2014/0295231 A1* | 10/2014 | Ise | ............... H01M 10/482 429/90 |
| 2014/0295282 A1* | 10/2014 | Harada | ............... H01M 4/485 429/231.2 |

FOREIGN PATENT DOCUMENTS

| CN | 101364642 A | 2/2009 |
| CN | 101935216 A | 1/2011 |
| CN | 102544466 A | 7/2012 |
| EP | 2 448 054 A1 | 5/2012 |
| JP | 2008-34368 | 2/2008 |
| JP | 2008-117625 | 5/2008 |
| JP | 2010-55855 | 3/2010 |
| JP | 2010-287496 | 12/2010 |
| JP | 2012-99287 A | 5/2012 |

OTHER PUBLICATIONS

Office Action issued Aug. 21, 2015 in Korean Patent Application No. 10-2014-0029338 (with English language translation).
(Continued)

*Primary Examiner* — Stewart Fraser
(74) *Attorney, Agent, or Firm* — Oblon, McClelland, Maier & Neustadt, L.L.P.

(57) ABSTRACT

According to one embodiment, there are provided an active material for a battery having a high effective capacity, a nonaqueous electrolyte battery, and a battery pack. The active material contains a niobium-titanium composite oxide. When the active material is subjected to powder X-ray diffraction (XRD) using a Cu-Kα ray source, a peak appears in a range of $2\theta=5°\pm0.5°$ in the diffraction pattern.

14 Claims, 10 Drawing Sheets

(56) References Cited

OTHER PUBLICATIONS

Graham Armstrong, et al., "TiO$_2$(B) Nanotubes as Negative Electrodes for Rechargeable Lithium Batteries" Electrochemical and Solid-State Letters, vol. 9, No. 3, 2006, pp. A139-A143.

Kun Tang, et al., "Nano-Pearl-String TiNb$_2$O$_7$ as Anodes for Rechargeable Lithium Batteries" Advanced Energy Materials, vol. 3, 2013, pp. 49-53.

Extended Search Report issued Sep. 10, 2014 in Patent Application No. 14158947.3.

U.S. Appl. No. 14/202,844, filed Mar. 10, 2014, Ise, et al.

Extended European Search Report issued Dec. 3, 2015 in Patent Application No. 15171839.2.

Combined Chinese Office Action and Search Report issued Oct. 30, 2015 in Patent Application No. 201410092332.7 (with English language translation).

* cited by examiner

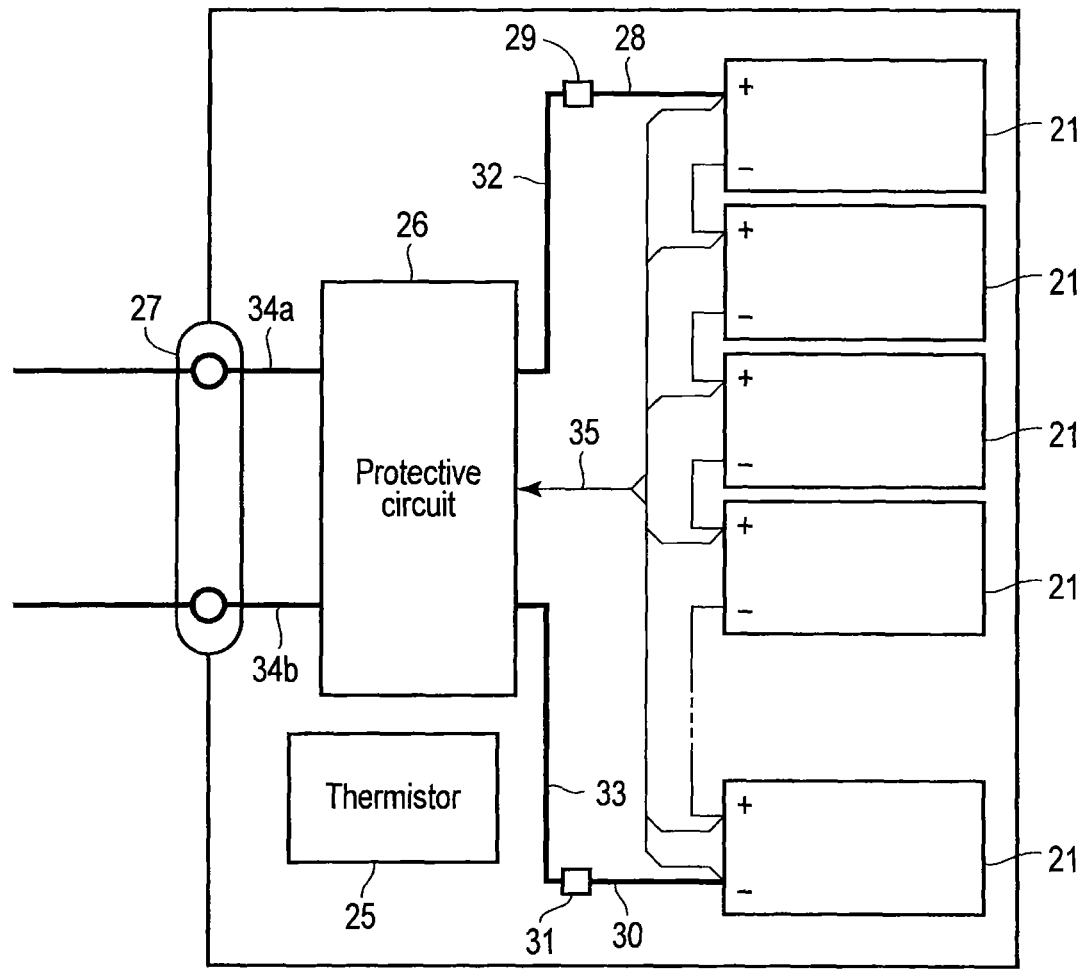
F I G. 5

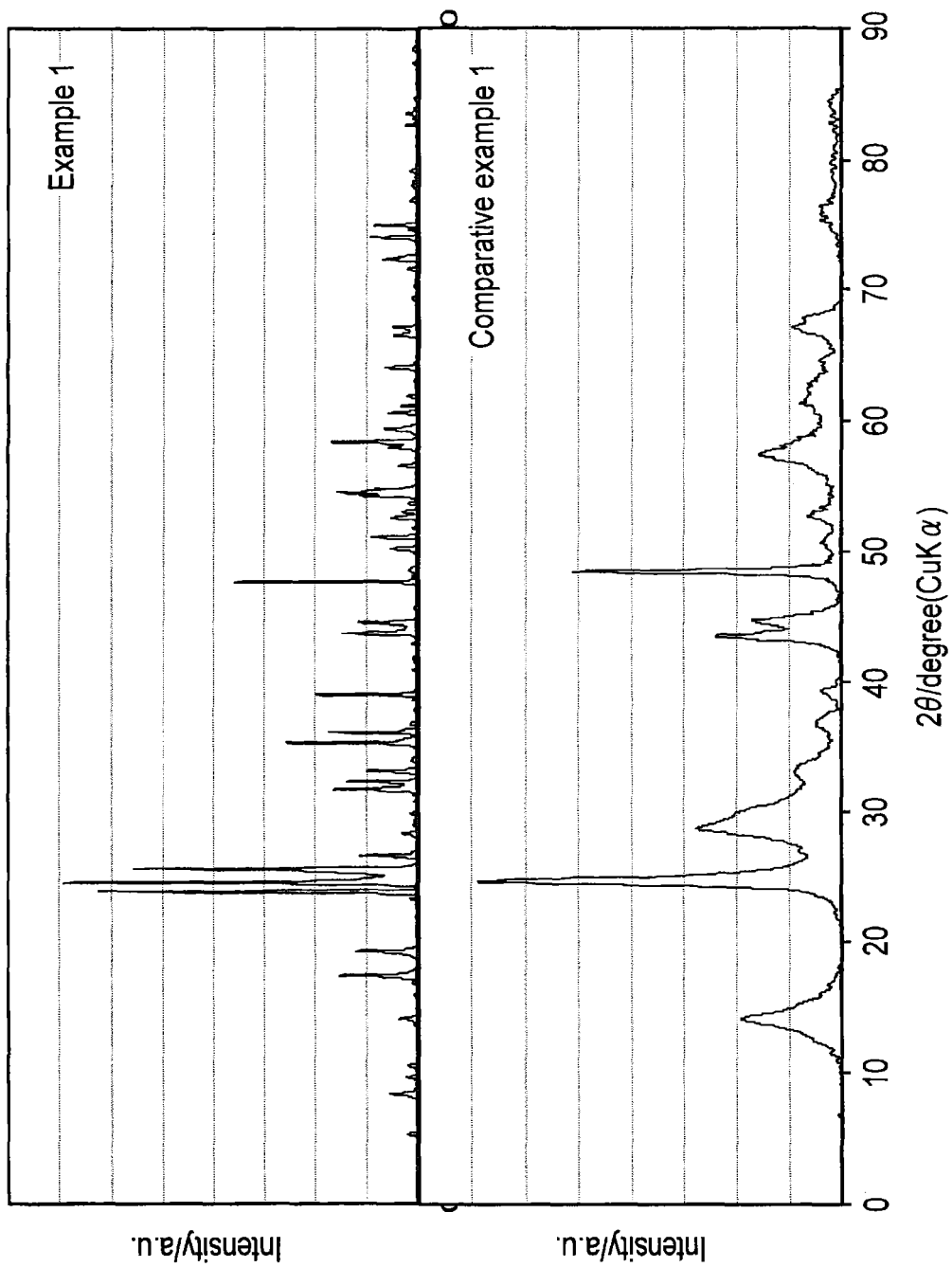
F I G. 6

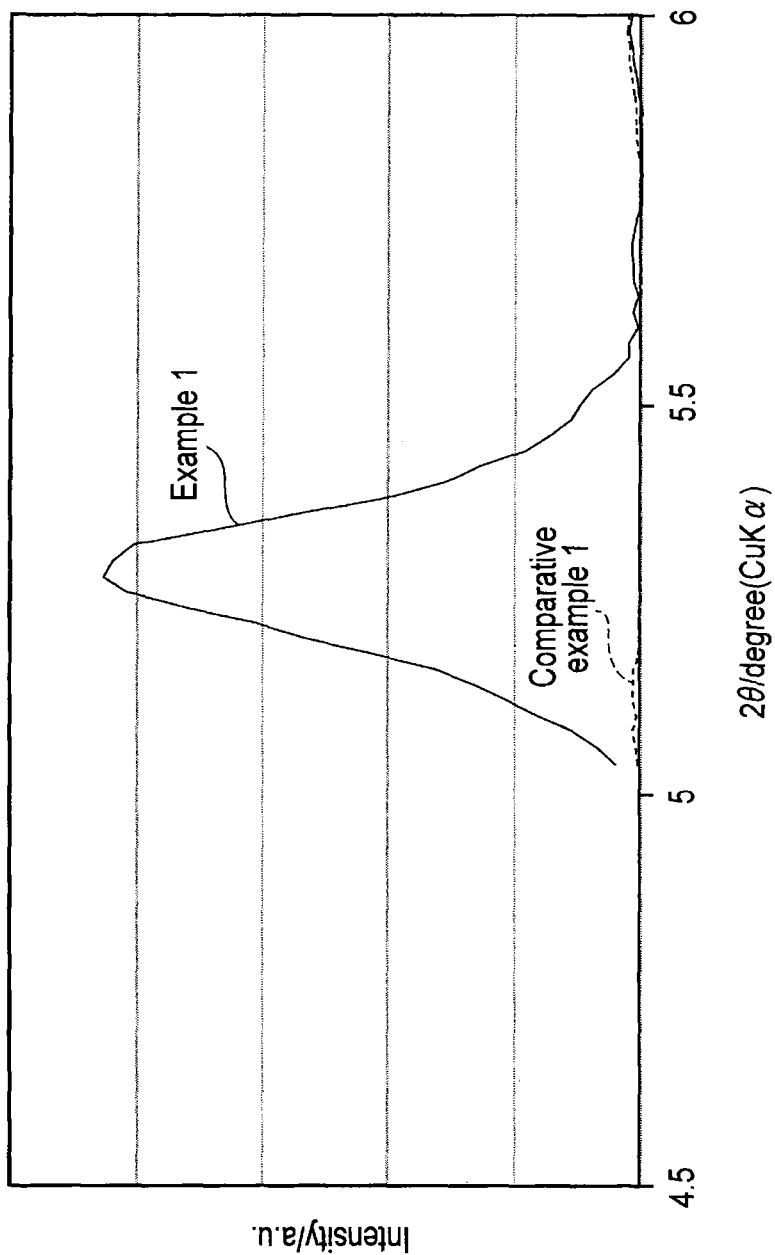
F I G. 7

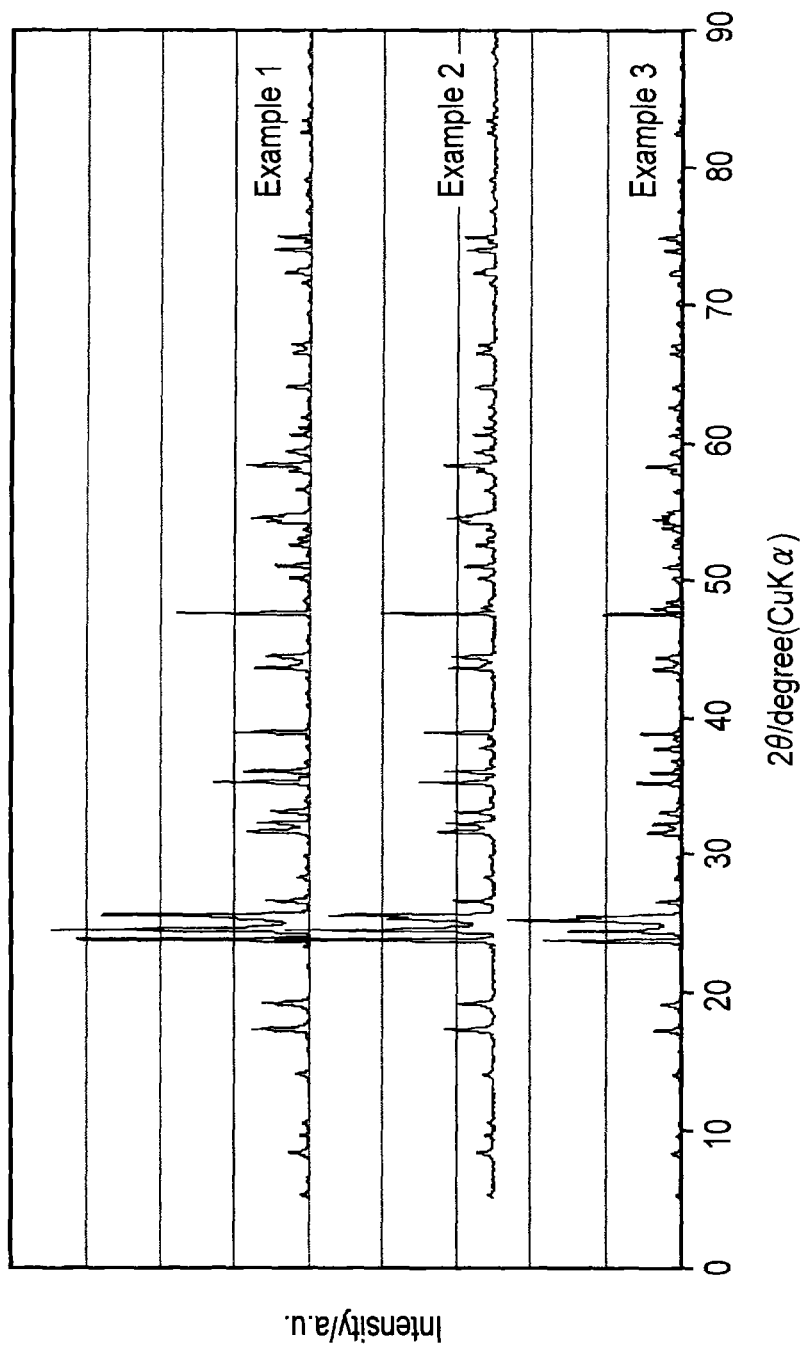
F I G. 8

BATTERY ACTIVE MATERIAL, NONAQUEOUS ELECTROLYTE BATTERY, AND BATTERY PACK

CROSS-REFERENCE TO RELATED APPLICATIONS

This application is based upon and claims the benefit of priority from Japanese Patent Applications No. 2013-065423, filed Mar. 27, 2013; and No. 2014-047901, filed Mar. 11, 2014; the entire contents of all of which are incorporated herein by reference.

FIELD

Embodiments described herein relate to an active material for a battery, a nonaqueous electrolyte battery and a battery pack.

BACKGROUND

A nonaqueous electrolyte battery has attracted attention as a high-energy density battery, and recently, has been actively researched and developed. Examples of the nonaqueous electrolyte batteries include a rechargeable lithium-ion battery. Metal composite oxides such as titanium oxide are investigated for use as a negative electrode active material for the rechargeable lithium-ion battery. The battery using the titanium oxide enables stable and rapid charge/discharge, and has a longer life than that of a battery using a conventional carbon material. However, further improved capacity of the battery using the titanium oxide has been desired.

BRIEF DESCRIPTION OF THE DRAWINGS

FIG. 5 is a block diagram showing an electric circuit of the battery pack of FIG. 4;

FIG. 6 is a powder XRD pattern for powder according to Example 1 or Comparative Example 1;

FIG. 7 is an enlarged view of the powder XRD pattern for powder according to Example 1 or Comparative Example 1;

FIG. 8 is powder XRD patterns according to Examples 1 to 3; and

DETAILED DESCRIPTION

Figure 1:
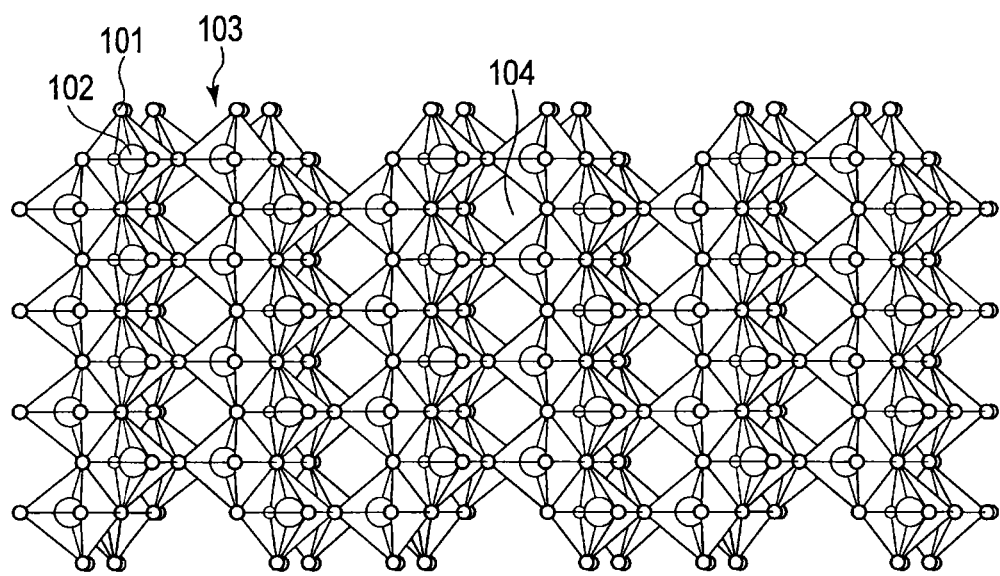
FIG. 1 is a typical view showing the crystal structure of a monoclinic titanium dioxide.

In general, according to one embodiment, there are provided an active material for a battery having a high effective capacity, a nonaqueous electrolyte battery, and a battery pack.

First Embodiment

According to a first embodiment, there is provided an active material containing a niobium-titanium composite oxide. When the active material is subjected to powder X-ray diffraction (XRD) using a Cu-Kα ray source, a characteristic diffraction pattern is observed. Specifically, a peak appears in a range of $2\theta=5°\pm0.5°$ in the diffraction pattern. A ratio of an intensity of the peak appeared in a range of $2\theta=5°\pm0.5°$ to an intensity of a first peak having the strongest intensity in the diffraction pattern is 0.01 or more. The intensity ratio is preferably less than 10, and more preferably 7 or less. When the intensity ratio is less than 10, the niobium-titanium composite oxide has high crystallinity. When the intensity ratio is 7 or less, a change of the crystal structure of the niobium-titanium composite oxide can be decreased.

Additionally, a peak appears in a range of $2\theta=14°\pm1.0°$ and a peak appears in a range of $2\theta=57°\pm1.0°$ in the diffraction pattern. A ratio of an intensity of the each peak to the intensity of the first peak having the strongest intensity is 0.01 or more.

Furthermore, in the diffraction pattern, a first peak having the strongest intensity, a second peak having the second strongest intensity, and a third peak having the third strongest intensity appear in a range of 2θ from 23° to 27°.

The active material according to the embodiment is suitably used as an active material for a nonaqueous electrolyte battery such as a rechargeable lithium-ion battery. Typically, the active material is suitably used as a negative electrode active material for the nonaqueous electrolyte battery.

The peak appearing in the range of $2\theta=5°\pm0.5°$ f the diffraction pattern is characteristic of the niobium-titanium composite oxide contained in the active material of the present embodiment. The peak appearing in the range of $2\theta=14°\pm1.0°$ and the peak appearing in the range of $2\theta=57°\pm1.0°$ also appear in the diffraction pattern for monoclinic titanium dioxide. Three peaks appearing in a range of 2θ from 23° to 27° also appear in the diffraction pattern for a conventional niobium-titanium composite oxide.

For example, in the diffraction pattern for a mixture obtained by mixing the monoclinic titanium dioxide with the conventional niobium-titanium composite oxide, a peak appears in the range of $2\theta=14°\pm1.0°$ and a peak appears in the range of $2\theta=57°\pm1.0°$. Additionally, the first peak having the strongest intensity, the second peak having the second strongest intensity, and the third peak having the third strongest intensity in the diffraction pattern appear in the range of 2θ from 23° to 27°. However, a peak is not observed in a range of $2\theta=\pm0.5°$.

Since the niobium-titanium composite oxide contained in the active material according to the embodiment has the characteristic diffraction pattern as described above, the niobium-titanium composite oxide is found to have a crystal structure different from that of the conventional niobium-titanium composite oxide. Such a crystal structure of the niobium-titanium composite oxide can be represented by the general formula $Nb_\alpha Ti_\beta O_{7+\gamma}$ (wherein $0\leq\alpha\leq24$, $0\leq\beta\leq1$, $-0.3\leq\gamma\leq0.3$). When the niobium-titanium composite oxide is used as the active material of the nonaqueous electrolyte secondary battery using lithium ions, the niobium-titanium composite oxide can be represented by the general formula $Li_xTiNb_yO_z$ (wherein $0\leq x\leq5$, $1\leq y\leq24$, $7\leq z\leq62$). In the general formula, x changes between 0 and 5 while the battery is charged and discharged. The examples of the compound represented by the general formula $Li_xTiNb_yO_z$ include $TiNbO_7$, $TiNb_2O_7$, $TiNb_{24}O_{62}$, $Li_5TiNbO_7$, $Li_5TiNb_{24}O_{62}$.

In the another aspect, when the niobium-titanium composite oxide is used as the active material of the nonaqueous electrolyte secondary battery using lithium ions, the niobium-titanium composite oxide can be represented by the general formula $Li_aTiM_bNb_cO_{7+\sigma}$ (wherein $0\leq a\leq5$, $0\leq b\leq0.3$, $0\leq c\leq10$, $-0.3\leq\sigma\leq0.3$). In the formula, M is at least one element selected from Fe, V, Mo and Ta. The examples of the compound represented by the general formula $Li_aTiM_bNb_cO_{7+\sigma}$ include $TiFe_{0.3}Nb_{1.7}O_7$, $TiV_{0.3}Nb_{1.7}O_7$, $TiMo_{0.3}Nb_{1.7}O_7$, $TiTa_{0.3}Nb_{1.7}O_7$.

Besides the niobium-titanium composite oxide having the above diffraction pattern, the active material according to the embodiment may contain impurities such as a niobium-titanium composite oxide having the other crystal structure, titanium oxide, niobium oxide or the like. In a preferred aspect, the niobium-titanium composite oxide having the above diffraction pattern is contained in the active material in the range of 10% by mass or more. More preferably, the niobium-titanium composite oxide is contained in the active material in the range of 50% by mass or more.

The active material according to the embodiment has a particulate form. The primary particle of the active material has the average particle diameter in a range of 0.01 μm to 50 μm, typically in a range of 1 μm to 50 μm. The particle has the aspect ratio typically in a range of 0.1 to 10. The particle has the BET specific surface area typically 1 m²/g or more and less than 300 m²/g.

Here, the method of powder X-ray diffraction measurement will be explained.

First, an target sample is ground until the average particle diameter reaches about 5 μm. The average particle diameter can be determined by laser diffractometry. The ground sample is filled in a holder part which is formed on a glass sample plate and has a depth of 0.2 mm. At this time, much care is necessary to fill the holder part fully with the sample. Then, a separate glass plate is used to smooth the surface of the sample by sufficiently pressing the separate glass plate against the sample. Much care should be taken to avoid too much or too little amount of the sample to be filled, thereby preventing any rises and dents in the basic plane of the glass holder. Much care is necessary to press the glass plate with sufficient pressure. The glass plate filled with the sample is set to a powder X-ray diffractometer, and the measurement is carried out by using Cu-Kα rays to obtain a diffraction pattern. A scanning rate of 5 deg/min, step width of 0.2 degree, tube voltage of 40 kV, and tube current of 300 mA are set as measurement conditions.

When the sample has a high orientation, there is the possibility of a shift of a peak position and variation in intensity ratio, depending on how the sample is filled. Such a sample having a significantly high orientation is measured using a capillary. Specifically, the sample is filled in the capillary, which is then mounted on a rotary sample table to perform measurement. Such a measuring method can reduce the influence of the orientation.

The active material contained in a battery as the electrode material can be measured in the following manner. First, the active material is put into the state in which lithium ions are perfectly released from the active material. When the active material is used in the negative electrode, the battery is put into a perfectly discharged state. This process makes it possible to observe the crystal state of the active material. However, residual lithium ions may exist even in such a discharged state.

Next, the battery is dismounted in a glove box filled with argon to take out the electrode. The taken-out electrode is washed with an adequate solvent. For example, ethylmethyl carbonate or the like may be used. The washed electrode is cut into approximately the same size as that of the holder of the powder X-ray diffractometer to prepare a measuring sample. The sample may be directly applied to the glass holder to be measured.

It is necessary to measure the diffraction pattern for the electrode current collector in advance to determine a position where a peak derived from the current collector appears. Also, it is necessary to determine in advance a position where a peak derived from the ingredient such as a conductive agent and a binder appears. When the peak of the current collector is overlapped on the peak of the active material, it is desired to separate the layer containing the active material from the current collector prior to the measurement so that the overlapped peaks are separated. It makes possible that the peak intensity is quantitatively measured. The procedure may be omitted if these data have been determined in advance. The electrode may be separated physically, but the electrode is easily separated by applying an ultrasonic wave to the electrode substrate in a solvent. The electrode recovered in this manner can be subjected to the powder X-ray diffraction of the active material. A clear peak can be determined by removing the background of the obtained diffraction pattern, and performing smoothing, kα removal, and a peak search.

The test showed that the battery active material containing the niobium-titanium composite oxide according to the embodiment had a higher effective capacity than those of the monoclinic titanium dioxide and the niobium-titanium composite oxide having the conventionally known crystal structure. The high effective capacity is considered to be attained since the niobium-titanium composite oxide according to the embodiment has a crystal structure similar to that of the monoclinic titanium dioxide.

The crystal structure of the monoclinic titanium dioxide mainly belongs to the space group C2/m, and has a structure as exemplified in FIG. 1. In the crystal structure, oxygen ions 101 are positioned at the top of an octahedron and a titanium ion 102 is positioned at the center portion of the octahedron. The crystal structure of the monoclinic titanium dioxide has a layer-like portion constituted of a skeletal structure 103 with successive octahedrons. A plurality of layer-like portions are alternately disposed, and thus, tunnel-like gaps 104 are formed. Many of the tunnel-like gaps 104 are observed on the plane (001). Lithium ions may be intercalated (inserted) into the gaps 104. When lithium ions are intercalated into the gaps 104, titanium ion constituting the skeleton is reduced from tetravalent to trivalent. Thus, the electroneutrality of the crystal is maintained. The crystal structure of the monoclinic titanium dioxide has one titanium ion per unit lattice (chemical formula). Therefore, the number of lithium ions capable of being inserted per chemical formula is theoretically up to 1. For this reason, the monoclinic titanium dioxide has a higher capacity than that of the other titanium dioxide such as titanium dioxide having anatase structure.

The peaks appearing in the diffraction pattern for the active material according to the embodiment in a range of $2\theta=14°\pm1.0°$ and in a range of $2\theta=57°\pm1.0°$ appear also in the diffraction pattern for the monoclinic titanium dioxide. Therefore, it is presumed that the niobium-titanium composite oxide contained in the active material according to the embodiment has a structure similar to the crystal structure of the monoclinic titanium dioxide, and tunnel-like gaps exist in the crystal structure.

The three peaks appearing in the range of 2θ from 23° to 27° appear also in the diffraction pattern for the conventional niobium-titanium composite oxide. Therefore, it is presumed that the niobium-titanium composite oxide contained in the active material according to the embodiment has the crystal structure of the monoclinic titanium dioxide as a basic structure, and the niobium-titanium composite oxide has a crystal structure in which some of titanium atoms are substituted by niobium atoms.

The niobium-titanium composite oxide contained in the active material according to the embodiment is presumed to have a composite structure in which a crystal structure of a monoclinic titanium dioxide ($TiO_2(B)$) and a crystal structure of $Nb_2TiO_7$ are mixed, for example.

While the conventional $Nb_2TiO_7$ has a theoretical capacity of 387 mAh/g, it has an effective capacity of about 284 mAh/g. The reason why the effective capacity is remarkably lower than the theoretical capacity is said to be because its electrical conductivity is generally low. However, another reason is considered to be because the repulsion between lithium ions is stronger in the crystal structure, which results in the decreased amount of the lithium ions which can stably exist in the crystal structure. On the other hand, since the niobium-titanium composite oxide according to the embodiment has the composite structure in which the crystal structure of the monoclinic titanium dioxide ($TiO_2(B)$) and the crystal structure of $Nb_2TiO_7$ are mixed, bonds between lithium ions and oxide ions (Li—O—Li) are likely to be formed. That is, many sites where the lithium ions can exist stably exist. Therefore, it is considered that more lithium ions can exist stably in the crystal structure, which results in the improved capacity.

When lithium ions are inserted into the niobium-titanium composite oxide, not only are Ti ions reduced from tetravalent to trivalent but also Nb ions are reduced from pentavalent to trivalent. Thus, the number of reduced valences per mass of the active material is large. Therefore, the electrical neutrality of the crystal can be maintained even if more lithium ions are inserted. Thus, the niobium-titanium composite oxide has a higher energy density than that of a compound such as Ti oxide only containing a tetravalent cation.

From the results described above, the battery active material containing the niobium-titanium composite oxide according to the embodiment has the advantage that it has a high effective capacity and a high energy density.

Next, a method for producing an active material for a battery according to the embodiment will be described.

First, a niobium source (for example, niobium oxide or niobium hydroxide or the like) and a titanate proton compound (for example, $H_2Ti_4O_9$) are used as raw materials. The active material according to the embodiment can be synthesized by mixing the raw materials and subjecting the mixture to a hydrothermal synthesis method.

An alkali titanate compound is acid-treated to exchange the alkali cation thereof for a proton, thereby obtaining a titanate proton compound. Hydrochloric acid or nitric acid or the like can be used as the acid. Potassium titanate, titanium sodium, or cesium titanate can be used as the alkali titanate compound.

In the titanate proton compound, the spacing of a (001) plane in the crystal structure thereof is preferably 6.22 Å or more. Such a titanate proton compound can be synthesized by immersing the alkali titanate compound for three weeks or more in an acid aqueous solution, or heating the alkali titanate compound to 70° C. in an acid aqueous solution when the alkali titanate compound is acid-treated.

The niobium source and the titanate proton compound are mixed at such a ratio that the ratio of the number of moles of niobium to the number of moles of titanium in the synthesized niobium-titanium composite oxide is 1 or more and less than 30. A composite of the synthesized powder and carbon can also be formed. A method for forming the composite of the synthesized powder and carbon is not particularly limited. Examples of the carbon source include saccharides, polyolefins, nitriles, alcohols, and an organic compound including a benzene ring. Carbon black and graphite or the like can be mechanically supported by using planetary ball mills or the like. After the powder is mixed with carbon, the mixture is fired in a reduction atmosphere.

In the hydrothermal synthesis method, conditions such as a heating temperature and a heat time may be appropriately selected. A solvent is selected from various solvents such as water and alkali according to the raw material.

As described above, the niobium-titanium composite oxide having a crystal structure different from that of the conventionally known niobium-titanium composite oxide can be obtained by mixing the niobium source and the titanate proton compound at a suitable ratio, and subjecting the mixture to hydrothermal synthesis.

Generally, the niobium-titanium composite oxide is obtained by a solid phase synthesis method. For example, the niobium-titanium composite oxide can be synthesized by mixing the titanium oxide such as anatase-type titanium oxide with the niobium source such as $NbO_2$, and firing the mixture. Such a niobium-titanium composite oxide synthesized by the conventional method does not have a tunnel structure in the crystal structure. However, according to the method in the embodiment, the niobium-titanium composite oxide having a tunnel structure similar to the tunnel structure existing in the crystal structure of the monoclinic titanium dioxide can be synthesized.

According to the embodiment, there is provided the active material capable of realizing the battery having a high effective capacity and a high energy density.

Second Embodiment

In the second embodiment, there is provided a nonaqueous electrolyte battery including a negative electrode containing the battery active material in the first embodiment, a positive electrode, a nonaqueous electrolyte, a separator, and a container.

Figure 2:
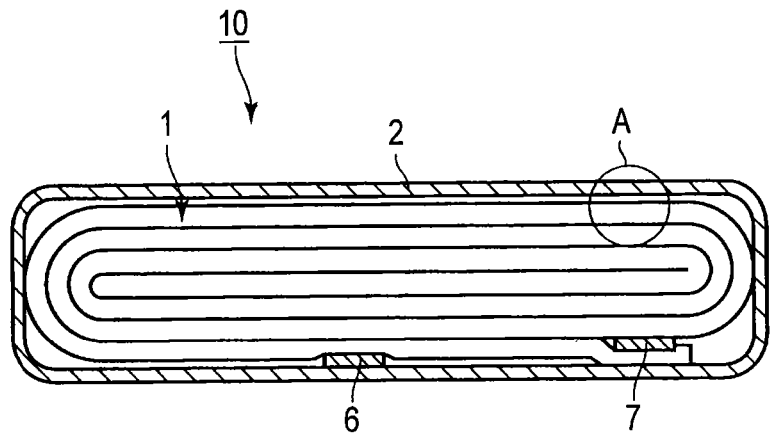
FIG. 2 is a sectional view of a flat-type nonaqueous electrolyte battery according to a second embodiment.
Figure 3:
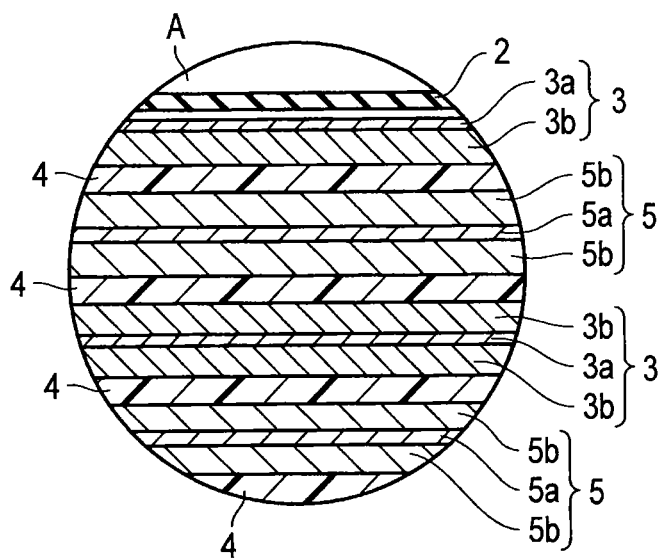
FIG. 3 is an enlarged sectional view of part A in FIG. 2.

A flat-type nonaqueous electrolyte secondary battery is shown as an example of the nonaqueous electrolyte battery in FIGS. 2 and 3. FIG. 2 is a sectional view of a battery 10. FIG. 3 is an enlarged sectional view of a portion A in FIG. 2. Each drawing is a pattern diagram to facilitate the description of the embodiments and its understanding. The shape, size, and ratio thereof are different from those of an actual device. However, they can be appropriately designed and modified by taking into consideration the following description and known techniques.

The battery 10 includes a bag-shaped container 2 and a flat-type wound electrode group 1 accommodated in the container 2. The container 2 keeps the nonaqueous electrolyte (not shown). The wound electrode group 1 is impregnated with the nonaqueous electrolyte.

In the wound electrode group 1, as shown in FIG. 3, a negative electrode 3, a separator 4, a positive electrode 5, and a separator 4 are stacked in this order from the outside. The negative electrode 3, the separator 4, the positive electrode 5, and the separator 4 are laminated in this order to produce a laminate. The laminate is spirally wound so that the negative electrode is located at an outermost periphery. The wound laminate is pressed while heating so that the flat-type wound electrode group 1 can be produced.

The negative electrode 3 includes a negative electrode current collector 3a and a negative electrode layer 3b. The part of the negative electrode 3 located at the outermost periphery includes the negative electrode layer 3b only on one internal surface of the negative electrode current collector 3a as shown in FIG. 3. Another part of the negative electrode 3 includes the negative electrode layer 3b on each surface of the negative electrode current collector 3a. The negative electrode layer 3b contains a negative electrode active material and, optionally, a conductive agent and a binder.

The positive electrode 5 includes a positive electrode current collector 5a and a positive electrode layer 5b. The positive electrode layer 5b is formed on each surface of the positive electrode current collector 5a. The positive electrode layer 5b includes a positive electrode active material and, optionally, a conductive agent and a binder.

As shown in FIG. 2, in the vicinity of the outer peripheral end of the wound electrode group 1, a negative electrode terminal 6 is connected to the negative electrode current collector 3a of the outermost negative electrode 3 and a positive electrode terminal 7 is connected to the positive electrode current collector 5a. These negative electrode terminal 6 and positive electrode terminal 7 are extended to outside through an opening of the container 2. The nonaqueous electrolyte is injected into the container 2 from the opening. The opening of the container 2 is heat-sealed in the state that the negative electrode terminal 6 and positive electrode terminal 7 are sandwiched, thereby the wound electrode group 1 and nonaqueous electrolyte are completely sealed.

The negative electrode terminal 6 is made of a material which is electrochemically stable at the potential which insertion/release of lithium ion occurs in the negative electrode active material and which has conductivity. Specific examples of the material for the negative electrode terminal 6 include Cu, Ni, stainless and aluminum. The negative electrode terminal 6 is preferably made of the same material as the negative electrode current collector 3a to reduce the contact resistance with the negative electrode current collector 3a.

The positive electrode terminal 7 is made of a material which is electrochemically stable in the potential range from 3 V to 5 V relative to metallic lithium and which has conductivity. Specifically, the positive electrode terminal 7 may be made of aluminum or an aluminum alloy containing at least one element such as Mg, Ti, Zn, Mn, Fe, Cu or Si. The positive electrode terminal 7 is preferably made of the same material as the positive electrode current collector 5a to reduce the contact resistance with the positive electrode current collector 5a.

The battery active material described in the first embodiment is used as the negative electrode active material contained in the negative electrode layer 3b. This enables the realization of a nonaqueous electrolyte battery having a high effective capacity and a high energy density. Though the negative electrode active material may be constituted of the battery active material described in the first embodiment, it may further contain other compounds. Examples of the other compounds include titanium dioxide having an anatase structure ($TiO_2$), lithium titanate having a rhamsdelite structure (e.g., $Li_2Ti_3O_7$), and lithium titanate having a spinel structure (e.g., $Li_4Ti_5O_{12}$). When the negative electrode active material contains the compounds other than the battery active material described in the first embodiment, the ratio of the battery active material described in the first embodiment is preferably 50% by mass or more based on the total mass of the negative electrode active material.

The conductive agent contained in the negative electrode active material layer 3b is blended to improve current-collecting performance and to suppress the contact resistance between the active material and the negative electrode current collector 3a. Examples of the conductive agent include carbonaceous materials such as acetylene black, carbon black, or graphite.

The binder is blended to fill gaps of the dispersed negative electrode active materials and also to bind the active material with the current collector. Examples of the binder include polytetrafluoroethylene (PTFE), polyvinylidene fluoride (PVdF), fluorine-based rubber, and styrene-butadiene rubber.

In the negative electrode layer 3b, the contents of the negative electrode active material, conductive agent, and binder are preferably in the range from 68% by mass to 96% by mass, from 2% by mass to 30% by mass and from 2% by mass to 30% by mass, respectively. When the amount of the conductive agent is 2% by mass or more, the current collecting performance of the negative electrode layer can be improved. Further, when the amount of the binder is 2% by mass or more, the binding strength between the negative electrode layer and the current collector is satisfactory and excellent cycle performance can be expected. On the other hand, in order to improve capacity, the contents of the conductive agent and the binder are preferably 30% by mass or less, respectively.

As the negative electrode current collector, a material is used which is electrochemically stable at the potential at which insertion/release of lithium ion occurs in the negative electrode active material. The current collector is preferably made of Cu, Ni, stainless steel or aluminum, or an aluminum alloy containing at least one element selected from Mg, Ti, Zn, Mn, Fe, Cu, and Si. The thickness of the negative electrode current collector is preferably 5 μm to 20 μm. When the thickness is in the range, the weight of the current collector can be reduced, while maintaining the strength of the electrode.

The negative electrode may be manufactured, for example, by suspending the negative electrode active material, binder and conductive agent if necessary, in an appropriate solvent to prepare a slurry, by applying this slurry to the surface of the negative electrode current collector and by drying the slurry to form a negative electrode active material layer, followed by pressing.

Alternatively, the negative electrode can be manufactured by mixing the negative electrode active material and binder, and the conductive agent if necessary, forming the mixture into a pellet. The pellet can be used as the negative electrode layer. The pellet is placed on the current collector.

As the positive electrode active material contained in the positive electrode active material layer 5b, for example, oxides or sulfides may be used. Examples of the oxides and sulfides include those into which lithium ion is inserted, for example, manganese dioxide ($MnO_2$), iron oxide, copper oxide, nickel oxide, lithium-manganese complex oxides (e.g. $Li_xMn_2O_4$ or $Li_xMnO_2$), lithium-nickel complex oxides (e.g. $Li_xNiO_2$), lithium-cobalt complex oxides (e.g. $Li_xCoO_2$), lithium-nickel-cobalt complex oxides (e.g. $LiNi_{1-y}Co_yO_2$), lithium-manganese-cobalt complex oxides (e.g. $Li_xMn_yCo_{1-y}O_2$), lithium-manganese-nickel complex oxides having a spinel structure (e.g. $Li_xMn_{2-y}Ni_yO_4$), lithium-phosphorous oxide having an olivine structure (e.g. $Li_xFePO_4$, $Li_xFe_{1-y}Mn_yPO_4$, and $Li_xCoPO_4$), iron sulfate ($Fe_2(SO_4)_3$), vanadium oxide (e.g. $V_2O_5$) and lithium-nickel-cobalt-manganese complex oxide. In the above formula, $0<x\le1$, $0\le y\le1$.

As the positive electrode active material, these compounds may be used alone or in combination with other compounds.

Preferable examples of the positive electrode active material include those having a high positive electrode voltage, for example, lithium-manganese complex oxides (e.g. $Li_xMn_2O_4$), lithium-nickel complex oxides (e.g. $Li_xNiO_2$), lithium-cobalt complex oxides (e.g. $Li_xCoO_2$), lithium-nickel-cobalt complex oxides (e.g. $LiNi_{1-y}Co_yO_2$), lithium-manganese-nickel complex oxides having a spinel structure (e.g. $Li_xMn_{2-y}Ni_yO_4$), lithium-manganese-cobalt complex oxides (e.g. $Li_xMn_yCo_{1-y}O_2$), lithium-iron phosphate (e.g.

$Li_xFePO_4$) and lithium-nickel-cobalt-manganese complex oxides. In the above formula, $0<x\leq1$, $0<y\leq1$.

Examples of a preferred positive electrode active material when the ordinary temperature molten salt is used as the nonaqueous electrolyte of the battery include lithium-iron phosphate, $Li_xVPO_4F$ ($0\leq x\leq1$), lithium-manganese complex oxide, lithium-nickel complex oxide, and lithium-nickel-cobalt complex oxide. Since these compounds have low reactivity with an ordinary temperature molten salt, the cycle life can be improved.

The average primary particle diameter of the positive electrode active material is preferably 100 nm to 1 μm. The positive electrode active material having an average primary particle diameter of 100 nm or more is easily handled in the production of the electrode. The positive electrode active material having an average primary particle diameter of 1 μm or less enables smooth progress of diffusion of lithium ions in a solid.

The specific surface area of the active material is preferably 0.1 $m^2$/g to 10 $m^2$/g. The positive electrode active material having a specific surface area of 0.1 $m^2$/g or more is capable of securing lithium ion-insertion sites sufficiently. The positive electrode active material having a specific surface area of 10 $m^2$/g or less is easily handled in the production of the electrode and can also secure good charge/discharge cycle performance.

The binder is blended to bind the active material with the current collector. Examples of the binder include a polytetrafluoroethylene (PTFE), polyvinylidene fluoride (PVdF) and fluorine-based rubber.

The conductive agent is blended according to the need to improve the current collecting ability of the active material and to reduce the contact resistance between the active material and the current collector. Examples of the conductive agent include carbonaceous materials such as acetylene black, carbon black, or graphite.

In the positive electrode active material layer 5b, the contents of active material and binder are preferably in the range from 80% by mass to 98% by mass and from 2% by mass to 20% by mass, respectively.

When the content of the binder is 2% by mass or more, sufficient electrode strength can be obtained. When the content of the binder is 20% by mass or less, the amount of an insulating material in the electrode can be reduced, making it possible to reduce internal resistance.

When the conductive agent is added, the contents of the positive electrode active material, binder and conductive agent are preferably in the range from 77% by mass to 95% by mass, from 2% by mass to 20% by mass and from 3% by mass to 15% by mass, respectively. When the amount of the conductive agent is 3% by mass or more, the aforementioned effect can be obtained. When the amount of the conductive agent is 15% by mass or less, the decomposition of the nonaqueous electrolyte on the surface of the positive electrode conductive agent when the battery is stored under high temperatures can be reduced.

The positive electrode current collector 5a is preferably made of an aluminum foil or aluminum alloy foil containing at least one element selected from Mg, Ti, Zn, Ni, Cr, Mn, Fe, Cu and Si.

The thickness of the aluminum foil or aluminum alloy foil is preferably 5 μm to 20 μm and more preferably 15 μm or less. The purity of the aluminum foil is 99% by mass or more. The content of transition metals such as Fe, Cu, Ni and Cr contained in the aluminum foil or aluminum alloy foil is preferably designed to be 1% by mass or less.

The positive electrode may be manufactured, for example, by suspending the positive electrode active material, binder and conductive agent if necessary, in an appropriate solvent to prepare a slurry, by applying this slurry to the surface of a positive electrode current collector and by drying the slurry to form a positive electrode layer, followed by pressing.

Alternatively, the positive electrode can be manufactured by mixing the positive electrode active material and binder, and the conductive agent if necessary, forming the mixture into a pellet. The pellet can be used as the positive electrode layer. The pellet is placed on the positive electrode current collector.

A liquid nonaqueous electrolyte or a gel-like nonaqueous electrolyte may be used as the nonaqueous electrolyte. The liquid nonaqueous electrolyte is prepared by dissolving an electrolyte in an organic solvent. The gel-like nonaqueous electrolyte is prepared by forming a complex of a liquid electrolyte and a polymer material.

The concentration of the electrolyte in the liquid nonaqueous electrolyte is preferably 0.5 mol/L to 2.5 mol/L.

Examples of the electrolyte include lithium salts such as lithium perchlorate ($LiClO_4$), lithium hexafluorophosphate ($LiPF_6$), lithium tetrafluorophosphate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], or mixtures of these compounds. The electrolyte is preferably one which is difficult to be oxidized at a high potential and $LiPF_6$ is most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either singly or in combination of two or more.

Examples of the polymer material include a polyvinylidene fluoride (PVdF), polyacrylonitrile (PAN) and polyethylene oxide (PEO).

Alternatively, an ordinary temperature molten salt (ionic melt), polymer solid electrolyte or inorganic solid electrolyte containing lithium ions may be used as the nonaqueous electrolyte.

The ordinary temperature molten salt means compound which can exist in a liquid state at normal temperature (15 to 25° C.) among organic salts constructed by organic cation and anion. Examples of the ordinary temperature molten salt include those which independently exist in a liquid state, those which are put into a liquid state when mixed with an electrolyte, and those which are put into a liquid state when mixed with an organic solvent. The melting point of the ordinary temperature molten salt to be used in a nonaqueous electrolyte battery is generally 25° C. or less. Further, the organic cation generally has a quaternary ammonium skeleton.

The polymer solid electrolyte is prepared by dissolving an electrolyte in a polymer material and by solidifying the mixture.

The inorganic solid electrolyte is a solid material having lithium ion conductivity.

As the separator 4, a porous film made from materials such as polyethylene, polypropylene, cellulose, or polyvinylidene fluoride (PVdF), a synthetic resin nonwoven fabric or the like can be used. A porous film made of polyethylene or polypropylene melts at a certain temperature and can block electric current, and thus it is preferred from the viewpoint of improvement in safety.

As the container 2, a baggy container formed of a laminate film or a metal container is used.

Examples of the shape of the container 2 include a flat type (thin type), angular type, cylinder type, coin type, button type, sheet-type, and lamination-type shapes. The container having a size corresponding to the dimensions of a battery are used. For example, containers for small-sized batteries to be mounted on portable electronic devices and containers for large-sized batteries to be mounted on, for example, two- to four-wheel vehicles are also used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon or polyethylene terephthalate (PET) may be used for the resin layer. The laminate film can be molded into a desired shape by sealing through thermal fusion. The thickness of the laminate film is preferably 0.5 mm or less, more preferably 0.2 mm or less.

The metal container may be made of aluminum, an aluminum alloy or the like. The aluminum alloy is preferably an alloy containing one or more elements selected from Mg, Zn, and Si. When the alloy contains transition metals such as Fe, Cu, Ni or Cr, the amount of the transition metals is preferably 1% by mass or less. The metal container preferably has a thickness of 1 mm or less, more preferably 0.5 mm or less, still more preferably 0.2 mm or less.

The above embodiment can provide a nonaqueous electrolyte battery having a high effective capacity and a high energy density.

Third Embodiment

Next, a battery pack according to a third embodiment will be explained with reference to the drawings. The battery pack includes one or two or more of the above nonaqueous electrolyte batteries (unit cells) according to the second embodiment. When the battery pack includes two or more unit cells, these unit cells are disposed in such a manner that they are electrically connected in series or in parallel.

Figure 4:
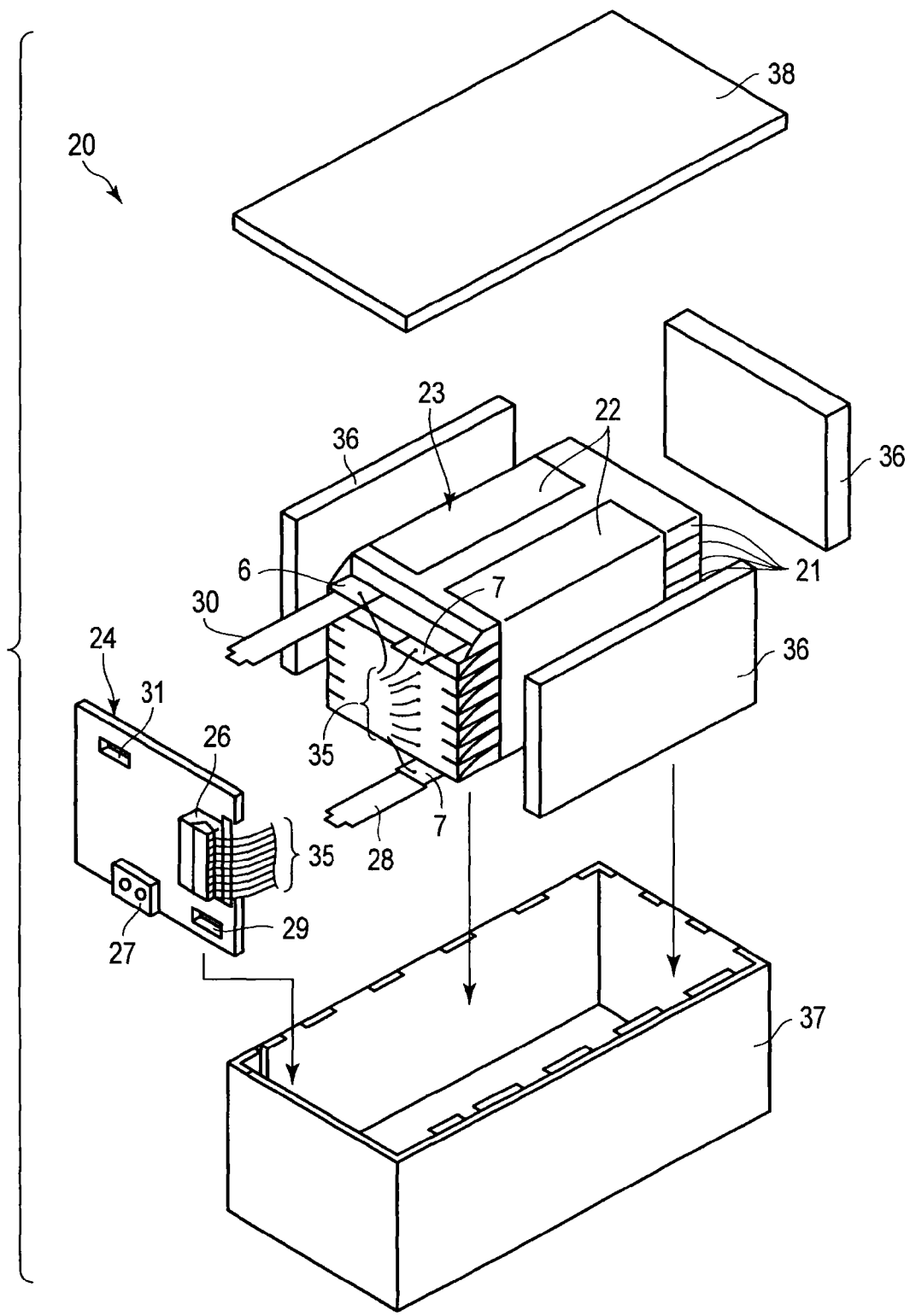
FIG. 4 is an exploded perspective view of a battery pack according to a third embodiment.

FIG. 4 and FIG. 5 show an example of a battery pack 20. This battery pack 20 includes one or more flat-type unit cells 21 having the structure shown in FIG. 2. FIG. 4 is an exploded perspective view of the battery pack 20. FIG. 5 is a block pattern showing the electric circuit of the battery pack 20 shown in FIG. 4.

A plurality of unit cells 21 are laminated such that the externally extended negative electrode terminals 6 and positive electrode terminals 7 are arranged in the same direction and fastened with an adhesive tape 22 to thereby constitute a battery module 23. These unit cells 21 are electrically connected in series as shown in FIG. 5.

A printed wiring board 24 is disposed opposite to the side surface of the unit cell 21 from which the negative electrode terminal 6 and positive electrode terminal 7 are extended. As shown in FIG. 5, a thermistor 25, a protective circuit 26 and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode side lead 28 is connected to the positive electrode terminal 7 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 6 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detect the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 7 and FIG. 8, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the negative electrode terminal 6 and positive electrode terminal 7 are projected.

The battery module 23 is accommodated in a container 37 together with each protective sheet 36 and printed wiring board 24. Specifically, the protective sheet 36 is disposed on each inside surface in the direction of the long side and on one of the inside surfaces in the direction of the short side of the container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the container 37.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 4 and FIG. 5. However, these unit cells may be connected in parallel to increase the capacity of the battery. The assembled battery packs may be further connected in series or in parallel.

According to the above embodiment, a battery pack having a high effective capacity can be provided.

EXAMPLES

Hereinafter, the above embodiment will be described more in detail based on the Examples.

Example 1

A niobium-titanium composite oxide represented by the general formula $TiNb_2O_7$ was synthesized.

Commercially available niobium oxide ($Nb_2O_5$) and a titanate proton compound were used as starting materials. The titanate proton compound was prepared by immersing potassium titanate in hydrochloric acid at 25° C. for 72 hours. In the process, 1M hydrochloric acid was replaced with a fresh 1M of acid every 24 hours. As a result, potassium ions were exchanged for protons and the titanate proton compound was obtained.

The niobium oxide ($Nb_2O_5$) and the titanate proton compound were weighed such that the molar ratio of niobium to titanium in the synthesized compound was 3, and they were put in 100 ml of pure water, followed by mixing. The obtained mixture was placed in a heat resistant container, and was subjected to hydrothermal synthesis under conditions of 180° C. for a total of 24 hours. The obtained sample was washed in pure water three times, and then dried. The sample was further dried by firing the sample using an electric furnace. As a result, a niobium-titanium composite oxide ($TiNb_2O_7$) according to Example 1 was obtained.

Example 2

A niobium-titanium composite oxide was synthesized in the same manner as in Example 1 except that niobium oxide ($Nb_2O_5$) and a titanate proton compound were weighed such that the molar ratio of niobium to titanium in the synthesized compound was 2. As a result, a niobium-titanium composite oxide ($TiNb_2O_7$) according to Example 2 was obtained.

Example 3

A niobium-titanium composite oxide was synthesized in the same manner as in Example 1 except that niobium oxide ($Nb_2O_5$) and a titanate proton compound were weighed such that the molar ratio of niobium to titanium in the synthesized compound was 1. As a result, a niobium-titanium composite oxide ($TiNb_2O_7$) according to Example 3 was obtained.

Example 4

A niobium-titanium composite oxide was synthesized in the same manner as in Example 1 except that the heat condition in the hydrothermal synthesis is changed to 120° C. for a total of 24 hours. As a result, a niobium-titanium composite oxide ($TiNb_2O_7$) according to Example 4 was obtained.

Example 5

A niobium-titanium composite oxide was synthesized in the same manner as in Example 2 except that the heat condition in the hydrothermal synthesis is changed to 120° C. for a total of 24 hours. As a result, a niobium-titanium composite oxide ($TiNb_2O_7$) according to Example 5 was obtained.

Example 6

A niobium-titanium composite oxide was synthesized in the same manner as in Example 3 except that the heat condition in the hydrothermal synthesis is changed to 120° C. for a total of 24 hours. As a result, a niobium-titanium composite oxide ($TiNb_2O_7$) according to Example 6 was obtained.

Example 7

A niobium-titanium composite oxide was synthesized in the same manner as in Example 3 except that niobium oxide ($Nb_2O_5$) and a titanate proton compound and iron oxide ($Fe_2O_3$) were weighed such that the molar ratio of niobium to titanium and of iron to titanium in the synthesized compound was 3 and 0.3, respectively. As a result, a niobium-titanium composite oxide ($TiFe_{0.3}Nb_{1.7}O_7$) according to Example 7 was obtained.

Example 8

A niobium-titanium composite oxide was synthesized in the same manner as in Example 3 except that commercially available molybdenum oxide ($Mo_2O_5$) and a titanate proton compound and iron oxide ($Fe_2O_3$) were weighed such that the molar ratio of niobium to titanium and of molybdenum to titanium in the synthesized compound was 3 and 0.3, respectively. As a result, a niobium-titanium composite oxide ($TiFe_{0.3}Mo_{1.7}O_7$) according to Example 8 was obtained.

Comparative Example 1

A titanium oxide compound was synthesized by using potassium titanate $K_2Ti_4O_9$ as a starting material.

A titanate proton compound $H_2Ti_4O_9$ was synthesized by using a commercially available $K_2Ti_4O_9$ reagent as a starting material. First, in order to remove impurities, the $K_2Ti_4O_9$ powder was washed with distilled water. Then, 5 g of $K_2Ti_4O_9$ powder was put in a zirconia pot having an inner volume of 100 cm³. Zirconia balls having a diameter of 10 mm were added until the volume became one-third that of the pot. The Zirconia balls were rotated at 800 rpm for 2 hours thereby grinding $K_2Ti_4O_9$ until the average particle diameter was about 5 μm.

The ground $K_2Ti_4O_9$ powder was then added to a hydrochloric acid solution having a concentration of 1 M, and the mixture was stirred at 25° C. for 72 hours. In the process, 1M hydrochloric acid was replaced with a fresh 1M of acid every 24 hours. As a result, potassium ions were exchanged for protons and a proton-exchanged compound $H_2Ti_4O_9$ was obtained.

The obtained suspension had good dispersibility, and thus it was difficult to separate it by filtration. Thus, the proton-exchanged compound was separated from the solvent using a centrifuge. The powder of the proton-exchanged compound thus obtained was washed with pure water until the pH of the wash solution was 6 to 7.

Next, the proton-exchanged compound was heated at 350° C. for a total of 3 hours. The heated sample was rapidly taken out of the electric furnace and cooled quickly in air. Then, the sample was dried at 80° C. under vacuum for 12 hours to obtain titanium dioxide having a $TiO_2$ (B) structure.

Comparative Example 2

Commercially available oxide reagent $Nb_2O_5$ and $TiO_2$ were used as starting materials. These powders were weighed such that the molar ratio of niobium to titanium was 2, and mixed in a mortar. The obtained mixture was then introduced into an electric furnace and fired at 1350° C. for a total of 30 hours. As a result, a niobium-titanium composite oxide ($TiNb_2O_7$) according to Comparative Example 2 was obtained.

Comparative Example 3

A niobium-titanium composite oxide was synthesized in the same manner as in Comparative Example 2 except that $Nb_2O_5$ and $TiO_2$ were weighed such that the molar ratio of niobium to titanium was 2.1. As a result, a niobium-titanium composite oxide ($Ti_{0.9}Nb_{2.1}O_7$) according to Comparative Example 3 was obtained.

Comparative Example 4

A niobium-titanium composite oxide was synthesized in the same manner as in Comparative Example 2 except that $Nb_2O_5$ and $TiO_2$ were weighed such that the molar ratio of niobium to titanium was 1.9. As a result, a niobium-titanium composite oxide ($Ti_{1.1}Nb_{1.9}O_7$) according to Comparative Example 4 was obtained.

Comparative Example 5

A niobium-titanium composite oxide was synthesized in the same manner as in Comparative Example 2 except that niobium oxide ($Nb_2O_5$) and a titanate proton compound were weighed such that the molar ratio of niobium to titanium in the synthesized compound was 3. As a result, a niobium-titanium composite oxide ($TiNb_2O_7$) according to Comparative Example 5 was obtained.

Comparative Example 6

A niobium-titanium composite oxide was synthesized in the same manner as in Comparative Example 2 except that niobium oxide ($Nb_2O_5$) and a titanate proton compound were weighed such that the molar ratio of niobium to titanium in the synthesized compound was 1. As a result, a niobium-titanium composite oxide ($TiNb_2O_7$) according to Comparative Example 6 was obtained.

XRD Measurement

Samples of Examples 1 to 6 and Comparative Examples 1 to 6 were subjected to XRD to obtain diffraction patterns. The measurement was performed with a powder X-ray diffractometer (MXP18) manufactured by Max science. Each of the samples was filled in a holder portion which was formed on a glass sample plate and had a depth of 0.2 mm. Then, a separate glass plate was used to smooth the surface of the sample by sufficiently pressing the separate glass plate against the sample. The glass plate filled with the sample was set in a powder X-ray diffractometer, and a diffraction pattern was obtained by using Cu-Kυ rays. The measurement condition was as follows: a scanning rate of 5 deg/min, a step width 0.2 deg, a tube voltage of 40 kV, and a tube current of 300 mA.

Results

The diffraction patterns for Example 1 and Comparative Example 1 are shown in FIGS. 6 and 7. FIG. 7 is an enlarged view around $2\theta=5°$ of the diffraction patterns in FIG. 6. In the diffraction pattern for Example 1, a peak appeared in a range of $2\theta=5°\pm0.5°$. On the other hand, in the diffraction pattern for Comparative Example 1, a peak was not observed in a range of $2\theta=5°\pm0.5°$. This showed that the peak was not observed in the range of $2\theta=5°\pm0.5°$ in the diffraction pattern for the niobium-titanium composite oxide synthesized by a solid phase method.

In the diffraction pattern for Example 1, a first peak having the strongest intensity, a second peak having the second strongest intensity, and a third peak having the third strongest intensity appeared in a range of $2\theta$ from 23° to 27°. In the diffraction pattern for Comparative Example 1, peaks were observed at the same positions as those of the first, second, and third peaks in the diffraction pattern for Example 1, while some peaks had low intensity.

In the diffraction pattern for Example 1, a peak was observed in a range of $2\theta=14°\pm1.0°$, and a peak was observed in a range of $2\theta=57°\pm1.0°$.

Figure 9:
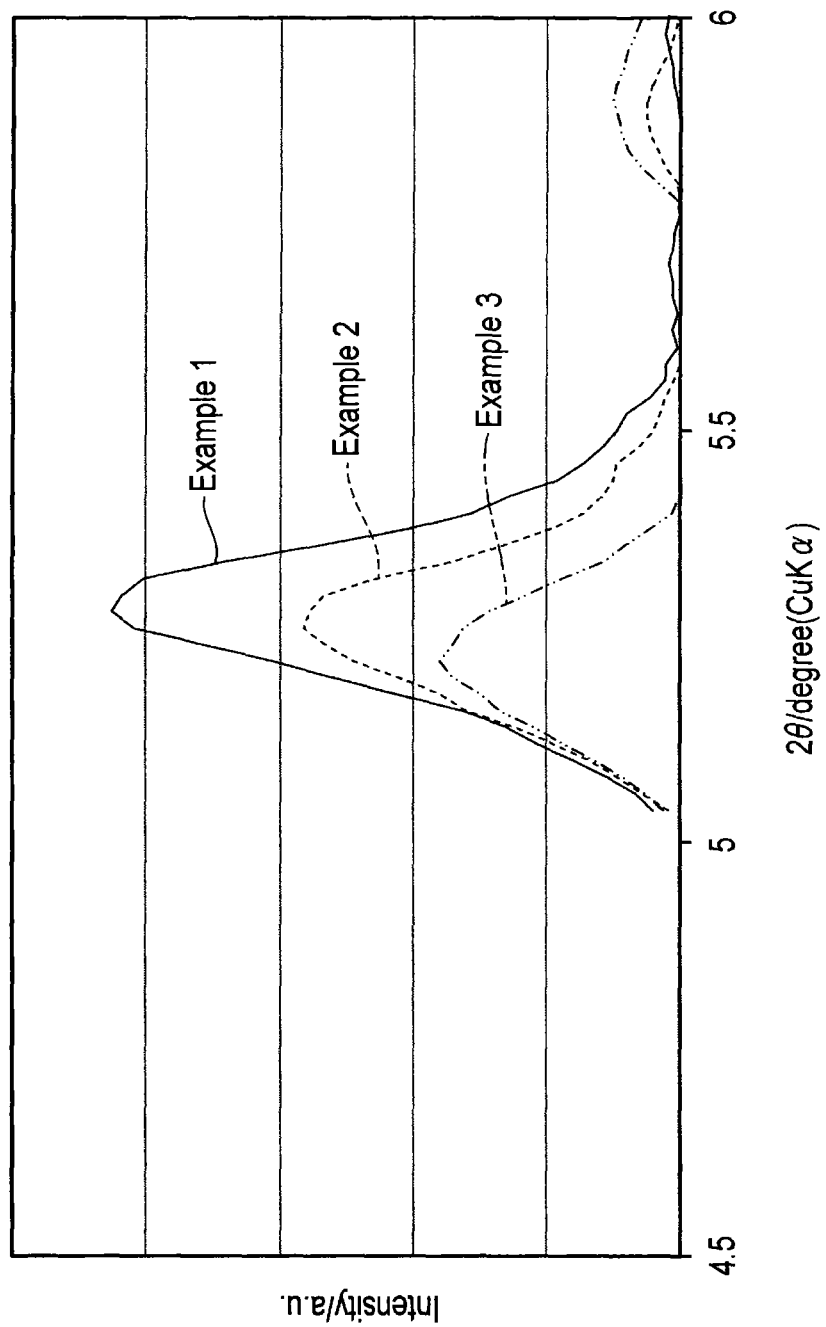
FIG. 9 is an enlarged view of powder XRD patterns according to Examples 1 to 3.
Figure 10:
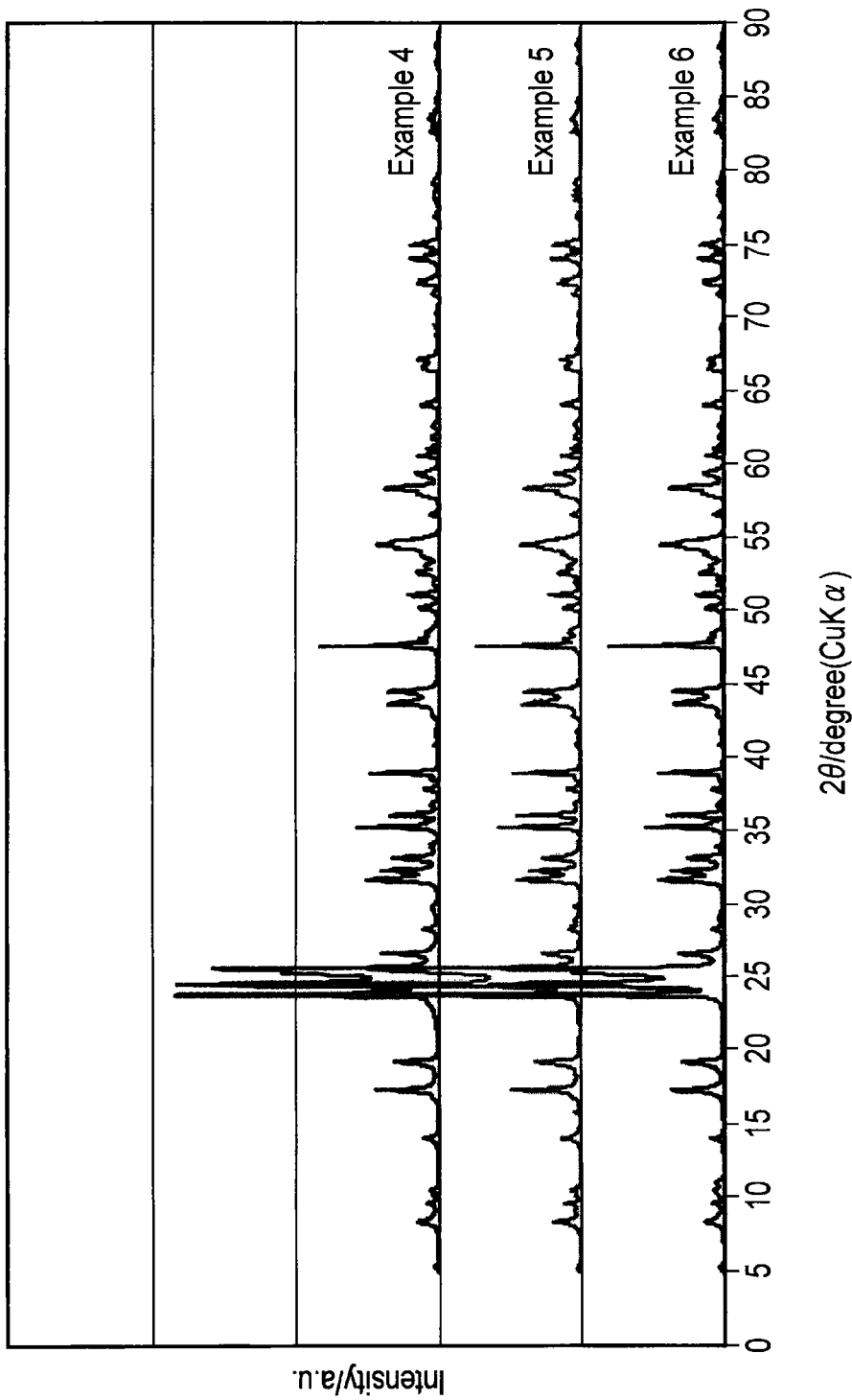
FIG. 10 is powder XRD patterns according to Examples 4 to 6.
Figure 11:
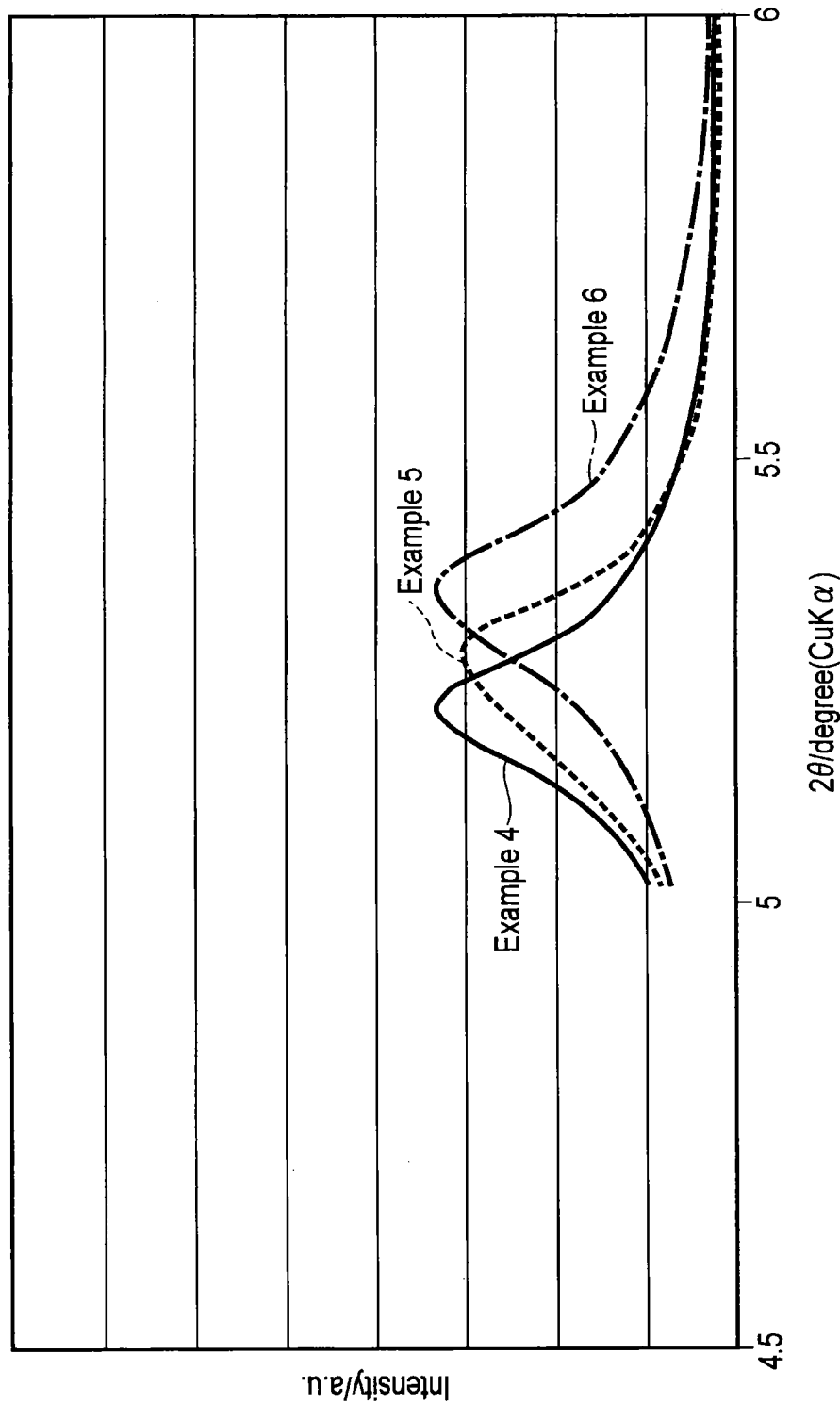
FIG. 11 is an enlarged view of powder XRD patterns according to Examples 4 to 6.

The diffraction patterns for Examples 1 to 3 are shown in FIGS. 8 and 9. FIG. 9 is an enlarged view around $2\theta=5°$ of the diffraction patterns in FIG. 8. The diffraction patterns for Examples 4 to 6 are shown in FIGS. 10 and 11. FIG. 11 is an enlarged view around $2\theta=5°$ of the diffraction patterns in FIG. 10. In all the diffraction patterns for Examples 1 to 6, a peak appeared in a range of $2\theta=5°\pm0.5°$. A large difference was not observed in the diffraction patterns for Examples 1 to 6.

A peak was not observed in a range of $2\theta=5°\pm0.5°$ in Comparative Examples 2 to 6 as in Comparative Example 1.

A peak intensity ratio calculated from the diffraction pattern for Example 1 is shown in Table 1. The peak intensity ratio was calculated as follows: removing the background from the diffraction pattern; performing smoothing, $k\alpha$ removal, and a peak search; deciding the peak having the maximum value in the diffraction pattern; the peak intensity of the peak having the maximum value was defined as 1; and the intensity ratio of each peak was calculated. This intensity ratio is preferably 0.01 or more, and more preferably 0.03 or more.

TABLE 1

| $2\theta$ | Intensity ratio |
|---|---|
| 5 ± 0.5° | 0.03 |
| 14 ± 1.0° | 0.05 |
| 24 ± 1.0° | 0.9 |
| 25 ± 1.0° | 1 |
| 26 ± 1.0° | 0.81 |
| 56.5 ± 1.0° | 0.05 |

(Production of Electrochemistry Measuring Cell)

Electrodes were produced by using each of the samples of Examples 1 to 8 and Comparative Examples 1 to 6 as the active materials.

Ten wt % of polytetrafluoroethylene based on the total weight of the electrode was mixed with each sample as a binder. This mixture was molded to produce the electrode.

Ethylene carbonate and diethyl carbonate were mixed at a volume ratio 1:1, to prepare a mixed solvent. One mole of lithium perchlorate was dissolved in the mixed solvent to prepare an electrolyte solution.

A measuring cell was produced by using the titanium dioxide electrode obtained above, the counter electrode, and the electrolyte solution. Metallic foil made of lithium was used as the counter electrode.

Since the metallic lithium is used as the counter electrode in this measuring cell, the electrode potential of the electrode using the niobium-titanium composite oxide or the titanium dioxide is higher than that of the counter electrode. Therefore, the electrode using the niobium-titanium composite oxide or the titanium dioxide operated as the positive electrode. However, of course, the electrodes can also be used as the negative electrode by combining the electrodes with the positive electrode material. In the measuring cell, the directions of charge and discharge are reverse to those of the battery using the electrode containing the niobium-titanium composite oxide or the titanium dioxide as the negative electrode. In order to avoid any confusion, it is defined that the direction in which lithium ions are inserted into the electrode containing the niobium-titanium composite oxide or the titanium dioxide is referred to as a charge direction and a direction in which lithium ions are released from the electrode is referred to as a discharge direction.

(Evaluation of Charge/Discharge Capacity)

The effective capacities (discharge capacities) of the measuring cells according to Examples 1 to 6 and Comparative Examples 1 to 6 were measured. Charge/discharge measurement was performed under conditions of a potential range of 1.0 to 3.0 V based on the metallic lithium electrode, a charge/discharge current value of 0.05 mA/cm$^2$, and room temperature. The results are shown in Table 2. The ratios of the intensity of the peak appeared in the range of 2θ=5°±0.5° to the intensity of the first peak having the strongest intensity are also shown in Table 2.

TABLE 2

|  | Nb/Ti | Intensity ratio | Effective capacities (discharge capacities) mA h/g |
|---|---|---|---|
| Example 1 | 3 | 0.03 | 296 |
| Example 2 | 2 | 0.03 | 280 |
| Example 3 | 1 | 0.03 | 240 |
| Example 4 | 3 | 0.01 | 290 |
| Example 5 | 2 | 0.01 | 275 |
| Example 6 | 1 | 0.01 | 225 |
| Example 7 | 3 | 3 | 293 |
| Example 8 | 3 | 3 | 294 |
| Comparative example 1 | — | 0 | 240 |
| Comparative example 2 | 2 | 0 | 270 |
| Comparative example 3 | 2.1 | 0 | 268 |
| Comparative example 4 | 1.9 | 0 | 260 |
| Comparative example 5 | 3 | 0 | 266 |
| Comparative example 6 | 1 | 0 | 210 |

The results of Table 2 show that the effective capacity (discharge capacity) of the electrochemical measurement cell according to Example 1 is higher than that of the electrochemistry measurement cell according to Comparative Example. Examples 1 and 4 have the effective capacity higher than that of Comparable Example 5. Examples 2 and 5 have the effective capacity higher than that of Comparable Example 2. Examples 3 and 6 have the effective capacity higher than that of Comparable Example 6. Examples 7 and 8 containing element M also have the higher effective capacity. These results show that when the molar ratio of niobium to titanium is same, Examples having the intensity ratio of 0.01 or more have higher effective capacity.

In the above description, although the niobium-titanium composite oxide was represented such an embodiment not containing lithium, the niobium-titanium composite oxide can contain lithium and achieve the same effect. Further, the niobium-titanium composite oxide containing lithium by charging or discharging of the battery can also achieve the same effect.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a niobium-titanium composite oxide, wherein a peak appears in a range of 2θ=5°±0.5° and a first peak having the strongest intensity, a second peak having the second strongest intensity, and a third peak having the third strongest intensity appear in a range of 2θ from 23° to 27° in a diffraction pattern for the active material obtained by powder X-ray diffraction using a Cu-Kα ray source, and wherein a ratio of an intensity of the 2θ=5°±10.5° peak to an intensity of a first peak having the strongest intensity is 0.01 or more.

2. The active material according to claim 1, wherein a peak appears in a range of 2θ=14°±1.0° and a peak appears in a range of 2θ=57°±1.0° in the diffraction pattern, and a ratio of an intensity of the peak that appears in a range of 2θ=14°±1.0° to the intensity of the first peak having the strongest intensity is 0.01 or more, and a ratio of an intensity of the peak that appears in a range of 2θ=57°±1.0° to the intensity of the first peak having the strongest intensity is 0.01 or more.

3. The active material according to claim 2, wherein the niobium-titanium composite oxide is represented by the general formula $Li_xTiNb_yO_z$ (wherein 0≤x≤5, 1≤y≤24, 7≤z≤62).

4. The active material according to claim 2, wherein the niobium-titanium composite oxide is represented by the general formula $Li_aTiM_bNb_cO_{7+o}$ (wherein 0≤a≤5, 0≤b≤0.3, 0≤c≤10, −0.3≤a≤0.3), wherein M is at least one element selected from Fe, V, Mo and Ta.

5. The active material according to claim 2, wherein a crystal structure of the niobium-titanium composite oxide is represented by the general formula $Nb_\alpha Ti_\beta O_{7+\gamma}$ (wherein 0≤α≤24, 0≤β<1, −0.3≤γ≤0.3).

6. A nonaqueous electrolyte battery comprising:
a negative electrode comprising the active material according to claim 2;
a positive electrode; and
a nonaqueous electrolyte.

7. A battery pack comprising the battery according to claim 6 and a container containing the battery.

8. The active material according to claim 1, wherein the niobium-titanium composite oxide is represented by the general formula $Li_xTiNb_yO_z$ (wherein 0≤x≤5, 1≤y≤24, 7≤z≤62).

9. The active material according to claim 1, wherein the niobium-titanium composite oxide is represented by the general formula $Li_aTiM_bNb_cO_{7+o}$ (wherein 0≤a≤5, 0 b≤0.3, 0≤c≤10, −0.3≤σ≤0.3), wherein M is at least one element selected from Fe, V, Mo and Ta.

10. The active material according to claim 1, wherein a crystal structure of the niobium-titanium composite oxide is represented by the general formula $Nb_\alpha Ti_\beta O_{7+\gamma}$ (wherein 0≤α≤24, 0≤β≤1, −0.3≤γ≤0.3).

11. A nonaqueous electrolyte battery comprising:
a negative electrode comprising the active material according to claim 1;
a positive electrode; and
a nonaqueous electrolyte.

12. A battery pack comprising the battery according to claim 11 and a container containing the battery.

13. The active material according to claim 1, wherein the ratio of the intensity of the 2θ=5°±0.5° peak to the intensity of the first peak having the strongest intensity is less than 10.

14. The active material according to claim 1, wherein the ratio of the intensity of the 2θ=5°±0.5° peak to the intensity of the first peak having the strongest intensity is 7 or less.

\* \* \* \* \*